United States Patent [19]

Meynier

[11] Patent Number: 5,074,191
[45] Date of Patent: Dec. 24, 1991

[54] BRAKE BOOSTER HOUSING WITH A HUB STRUCTURE CONTAINING A VALVE MECHANISM ARRANGED INSIDE THE HOUSING

[75] Inventor: Guy Meynier, Aulnay-Sous-Bois, France

[73] Assignee: Bendix Europe Services Techniques, Drancy, France

[21] Appl. No.: 529,001

[22] Filed: May 24, 1990

[30] Foreign Application Priority Data

Jun. 15, 1989 [FR] France .................... 89 07982

[51] Int. Cl.[5] .............................. F15B 9/10
[52] U.S. Cl. .................. 91/369.2; 91/376 R
[58] Field of Search .......... 91/369.1, 369.2, 369.3, 91/376 R, 377, 378

[56] References Cited

U.S. PATENT DOCUMENTS

| 1,765,760 | 6/1930 | Duty et al. | 91/376 R |
| 2,985,143 | 5/1961 | Stelzer | 91/376 R |
| 4,499,812 | 2/1985 | Pressaco et al. | 91/376 R |
| 4,718,324 | 1/1988 | Gautier et al. | 91/376 R |

FOREIGN PATENT DOCUMENTS 1100380  1/1968  United Kingdom .
1161989  8/1969  United Kingdom .
2079390  1/1982  United Kingdom .

Primary Examiner—Edward K. Look
Assistant Examiner—F. Daniel Lopez
Attorney, Agent, or Firm—Larry J. Palguta; Ken C. Decker

[57] ABSTRACT

The pneumatic brake booster comprises a housing formed from a front and a rear half-shell 12 and 10, a piston structure dividing the housing internally into two chambers and composed of an assembly consisting of a plate 18 and of a diaphragm 20 and possessing centrally a hub structure 24 containing a distribution valve mechanism 26 actuatable by an input member 56 in order to generate a pressure difference selectively between the chambers. The valve mechanism 26 comprises a plunger 28 mounted axially slideably in a coaxial central bore 30 of the valve body and connected to the input member 56, the plunger defining a first shutter seat 32 at one of its ends, a second shutter seat 34 being formed in the valve body concentrically relative to the first shutter seat and a shutter means 36 mounted in the valve body and stressed elastically toward the first and second shutter seats, at least one elastic means 60 stressing the input member 56 axially away from the shutter seats. The hub structure 24 and the valve mechanism 26 are arranged inside the housing.

6 Claims, 1 Drawing Sheet

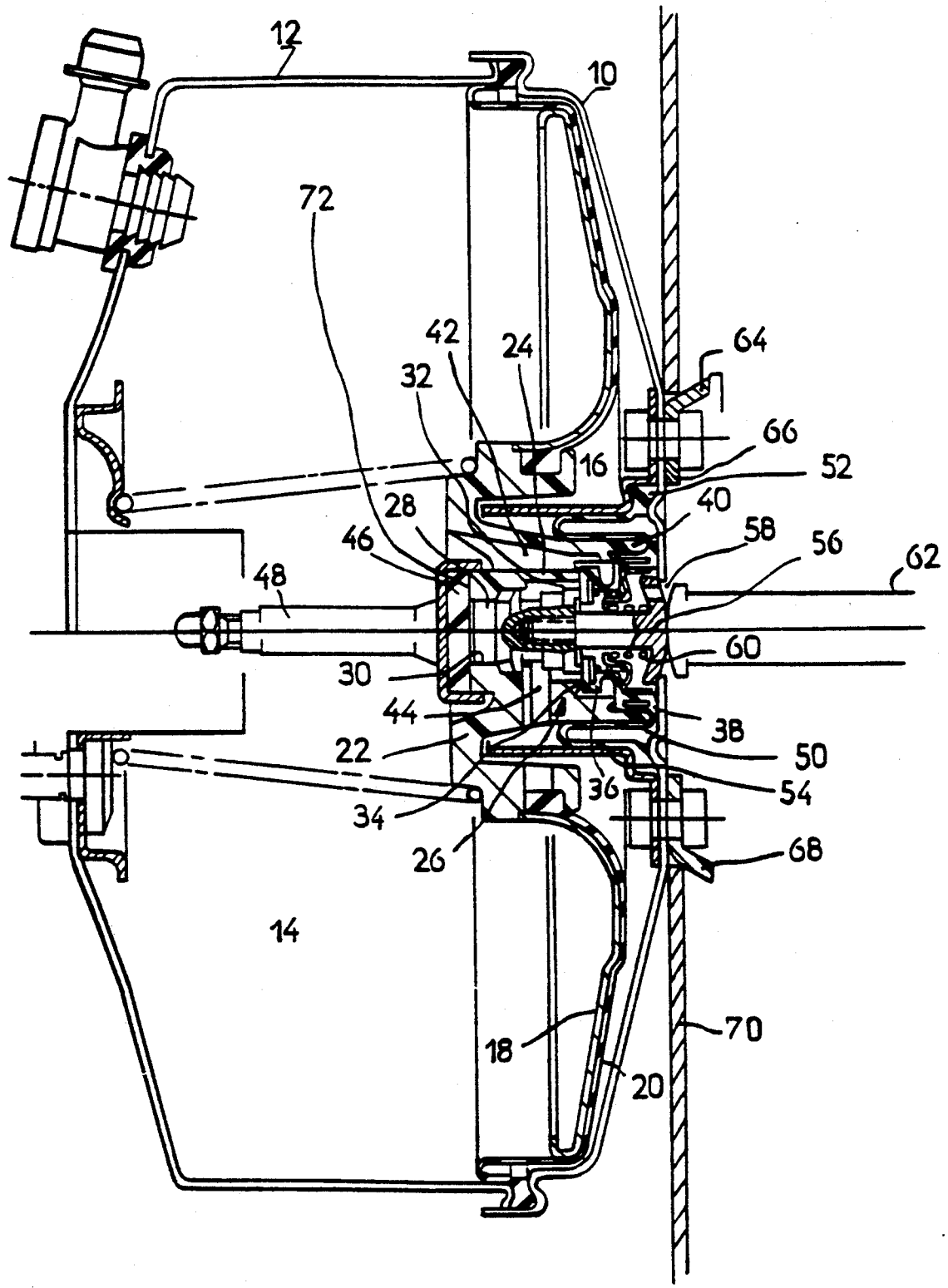

ically as possible. Various solutions have therefore been proposed for the robotized mounting of boosters having a chimney by way of the engine compartment, but most of the time they require a prepositioning of an accuracy higher than the current performances of assembly robots.

SUMMARY OF THE INVENTION

An object of the present invention is to provide a pneumatic booster of the type defined in general terms above, which is of lightweight design, robust, of low production cost and of reduced overall size and which allows automated assembly on a motor vehicle, without demanding a high accuracy of the assembly robot.

For this purpose, according to one feature of the invention, the hub structure and the valve hub are arranged inside the housing. This produces a booster no longer having a chimney on the rear part of the housing, thereby achieving a reduced weight and overall size.

According a more particular feature of the invention, the rear half-shell of the booster possesses an assembly part extending rearwards and intended for fastening the booster to the apron of a motor vehicle. Advantageously, this assembly part interacts with slots or slideways formed on the apron of the vehicle.

With such an arrangement, the mounting of the booster, if appropriate equipped with a master cylinder and with a brake-fluid reservoir, can be carried out laterally.

BRIEF DESCRIPTION OF THE DRAWINGS

The invention will now be described by way of example with reference to the accompanying drawing in which:

the single FIGURE is a view in longitudinal section of a pneumatic brake booster according to the invention.

DETAILED DESCRIPTION OF THE PREFERRED EMBODIMENTS

In the following description, by convention the direction in which the movable elements move in order to occupy their rest position will be called the "rear" of the booster and the direction in which the movable elements are moved during their actuation will be called the "front". The rear of the booster is thus shown in the right-hand part of the FIGURE, the front being located on the left.

The single FIGURE shows, in section, a pneumatic brake booster of the vacuum type, comprising a housing formed from a rear half-shell 10 and from a front half-shell 12 divided internally into a front chamber, or vacuum chamber 14, and a rear chamber, or working chamber 16, by means of a movable piston structure composed of an assembly consisting of a plate 18 and of a flexible diaphragm 20, the periphery of which is retained between the two half-shells of the housing. The plate 18 possesses a central part 22 which defines a hub structure 24 containing a distribution valve means designated as a whole by the reference 26. The valve means comprises a valve plunger 28 coupled to a booster input member intended to be actuated by a brake pedal, as will be described later. The valve plunger 28 is mounted slideably in a stepped bore 30 formed in the central part 22 of the plate 18. The rear end of the valve plunger 28 forms a first shutter seat 32 concentric relative to a second shutter seat 32 formed by the central part 22, these two shutter seats being intended to interact with a shutter element 36 stressed elastically in the direction of the shutter seats. In the embodiment illustrated, the shutter element 36 comprises a peripheral part or mounting bead 38 fitted into and retained in a tubular extension 40 extending towards the rear of the central part 22. The latter possesses, for example in the vicinity of its periphery, at least one axial passage 42 establishing communication between the vacuum chamber 14 and the shutter element 36 and a radial passage 44 establishing communication between the working chamber 16 and the shutter element 36. A reaction disc 46 is interposed between the rear end of an output rod 48 of the booster (intended to be coupled to a piston of a master cylinder not shown), on the one hand, and the front face of the valve plunger 28 and a front annular surface 72 of the central part 22 of the plate 18, on the other hand.

According to the invention, the hub structure and the valve means are arranged inside the housing, more specifically inside the rearwardly extending tubular part 40 of the central part 22, this tubular part 40 itself being arranged completely within the booster housing, as can be seen in the FIGURE.

In an advantageous embodiment of the invention, the shutter element 36 is extended, beyond the bead forming the mounting part 38, by a peripheral part 50, itself terminating in a part 52, for example in the form of a bead, engaging the rear half-shell sealingly. The peripheral part 50 surrounds the tubular part 40 and can advantageously come to rest within a tubular part 54 fixed to the rear half-shell of the booster and extending forwards. Sealing can advantageously be ensured at the junction of the rear half-shell and the tubular part 54 by means of the part 52. Thus, the rear working chamber 16 of the booster is delimited by the diaphragm 20 associated with the plate 18, by the rear half-shell 10 and by the peripheral part 50 of the shutter element 36.

The valve plunger 28 can be connected to an input member 56, the rear part of which extends radially outwards and, in the rest position, comes up against the rear half-shell, the rear part of the input member 56 being of a diameter larger than that of an orifice 58 made in the rear half-shell.

In the embodiment illustrated, a return spring 60 of the input member 56 bears, on the one hand, on the sheet-metal mounting support of the shutter element 36 in the tubular element 40 and, on the other hand, on the front face of the rear part of the input member 56.

It will be seen that, in accordance with the objects of the invention, the booster is of compact form since it no longer has a rear chimney, this contributing to making it lighter and less bulky.

The functioning of such a booster is conventional and will not be described here, the actuation of the booster being caused by a rod 62, itself actuated by a brake pedal (not shown).

The booster can be fastened to the vehicle by any suitable means, but advantageously the rear half-shell is intended to be equipped with an assembly part 64. This assembly part can take the form of tabs projecting rearwards or of an annular collar having a fastening part 66 on the outside of the rear half-shell and a frustoconical part 68.

The assembly part 64 is thus intended to interact with slideways or slots formed on the apron 70 of the vehicle, in such a way that the booster can be installed on this apron as a result of a translational movement perpendicular relative to its axis. The end of the slots or slideways will therefore be shaped in a known way in order to lock the booster when it reaches the correct position and keep it in this position.

The booster can then be actuated by the rod 62, advantageously in the form of a pusher, supported in terms of axial translational movement by an element fixed to the apron 70, and itself actuated by a brake pedal. The front end of the pusher and the rear end of the input member are substantially of spherical form and have convexities confronting one another, so as not to disturb the translational movement during assembly.

A booster, of which the mounting on a vehicle can easily be automated, has thus been provided, the assembly robot needing to execute only the operations of grasping the booster and pushing it laterally into the slots or slideways provided on the apron of the vehicle, until it is as far as it will go. The booster will then be locked in position, the input member 56 being located in front of the actuating rod 62.

Although the present invention has been described in relation to a particular embodiment, it is not limited to this, but on the contrary can have modifications and alternative versions which will appear to an average person skilled in the art.

What we claim is:

1. A pneumatic brake booster, comprising a housing formed from front and rear half-shells, a piston structure dividing the housing internally into two chambers and composed of an assembly comprising a plate and a diaphragm and possessing centrally a hub structure containing distribution valve means actuatable by an input member in order to generate selectively a pressure difference between the chambers, the valve means comprising a plunger mounted axially and slideably in a coaxial central bore of a valve body and connected to the input member, the plunger defining a first shutter seat at one end, a second shutter seat being formed in the valve body concentrically relative to the first shutter seat, shutter means mounted in the valve body and stressed elastically toward the first and second shutter seats, and elastic means stressing the input member axially away from the shutter seats, said hub structure and the valve means being arranged inside the housing, said shutter means having an assembly part engaging the hub structure sealingly and being extended by a peripheral part engaging sealingly the rear half-shell, and the input member having a rear part extending radially outwardly and, in a rest position, coming up against the rear-shell.

2. The booster according to claim 1, wherein the peripheral part of the shutter means extends on the outside of a rearwardly extending tubular extension of a central part of the hub structure and on the inside of a forwardly extending tubular part of the rear half-shell.

3. The booster according to claim 1, wherein the rear part of the input member has a substantially spherical form, the convexity of which is directed toward the rear half-shell.

4. The booster according to claim 1, wherein the rear half-shell possesses a booster assembly part extending rearwardly and intended for fastening the booster to an apron of a motor vehicle.

5. The booster according to claim 4, wherein the booster assembly part interacts with one of slots and slideways located on the apron of the vehicle.

6. The booster according to claim 1, wherein the booster is mounted by lateral movement on an apron of a vehicle.

* * * * *